Aug. 14, 1951        A. L. BURNS, JR        2,564,391

PROCESS OF NORMALIZING AND TRIMMING WELDED SECTIONS

Filed July 19, 1948        2 Sheets-Sheet 1

Albert L. Burns, Jr.
INVENTOR.

BY *James H. Weller*

ATTORNEY

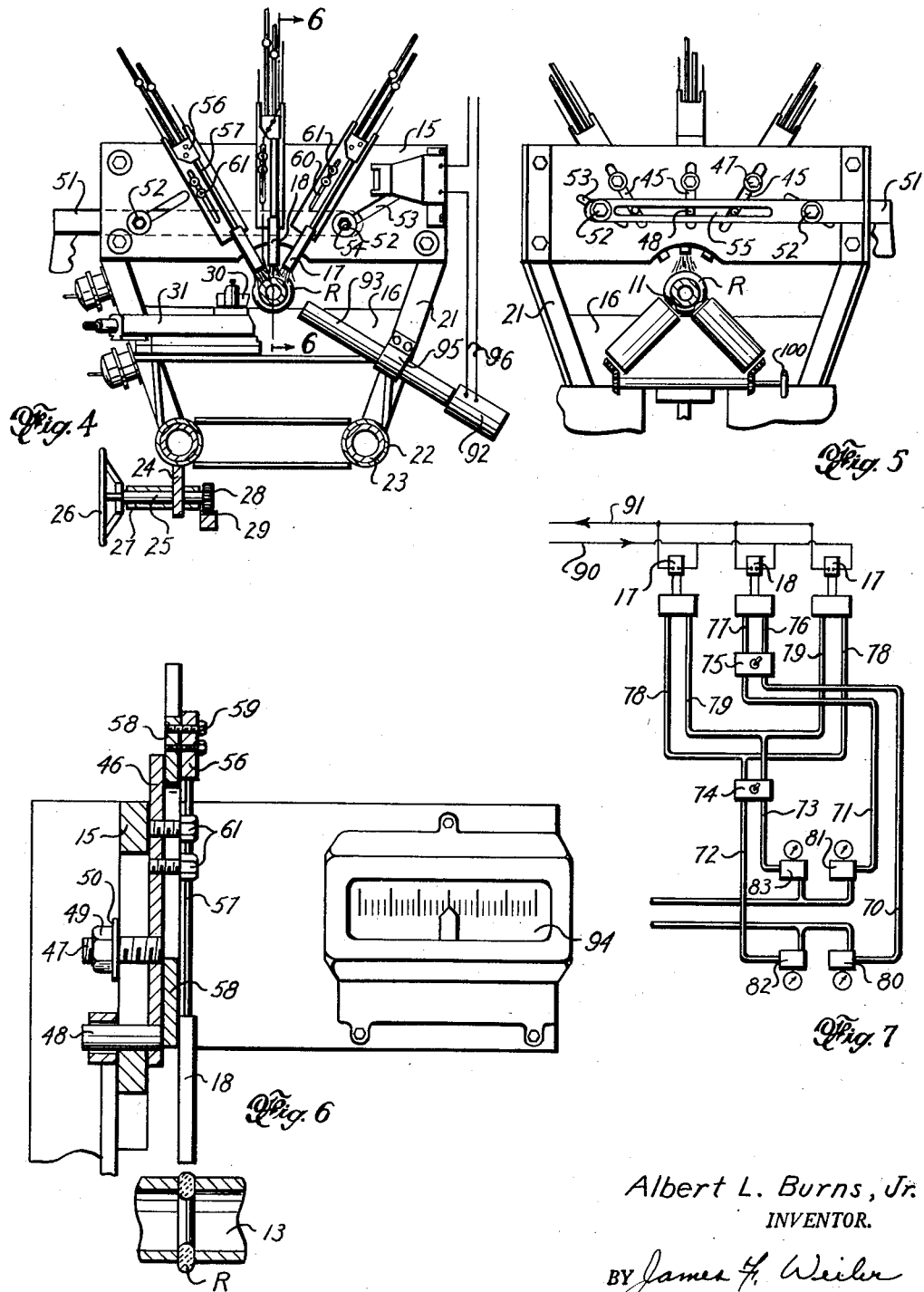

Patented Aug. 14, 1951

2,564,391

UNITED STATES PATENT OFFICE 2,564,391

PROCESS OF NORMALIZING AND TRIMMING WELDED SECTIONS

Albert L. Burns, Jr., Houston, Tex., assignor to Houston Oil Field Material Company, Inc., Houston, Tex., a corporation of Delaware Application July 19, 1948, Serial No. 39,553

6 Claims. (Cl. 148—11.5)

This invention relates to normalizing and removing excess material from a weld joint.

While the principles of this invention are applicable to normailizing operations and the removal of excess material from a welded connection in conjunction with many types of welding operations, they are particularly adaptable to use in connection with normalizing operations of butt-welded or pressure-welded cylindrical materials, such as tubing, pipes, tanks, shells, flues, rods, etc.

After sections of weldable materials have been welded together, the welded section is very strong and dense, but it is also very brittle and would not be suitable for uses requiring ductility, such as use in the oil fields, where such members are subjected to tensile, compressive and torque forces.

Weld sections may be relieved of stresses set up in such members during the welding operations in a conventional furnace by heating the entire section to normalizing temperature, permitting them to remain at such temperature for a predetermined time interval and cooling such sections slowly. This method is cumbersome, expensive and for many purposes the sections would be too soft for satisfactory use.

In many welding operations material is extruded at the weld joint to form a ridge of excess material and in many instances it is desirable to remove this upset portion or ridge.

In view of the above it is desirable to provide a method of and means for heating to normalizing temperature only that portion of the welded section having stresses set up therein and it is desirable to utilize the time interval during which the welded section is being maintained at normalizing temperature to insure grain structure changes being uniform from the outside to the inside of such section to remove the ridge or upset portion of excess material from the welded section.

It is accordingly among the objects of this invention to provide an improved and novel method for heat treating welded sections whereby only the portion containing stresses is subjected to the heat of normalization in an efficient, facile and inexpensive manner. Another object of this invention is to provide a process and apparatus to remove the ridge formed of excess or upset material from welded sections and in particular to utilize the heat of normalization to aid in the removal of such excess material. A more particular object is to utilize the time interval during which the welded section is being maintained at normalizing temperature to remove such ridge of extruded material.

Broadly a preferred form of appartus to be used in practicing my invention comprises a framework, a heating element made up of a plurality of flame heads or torches, a cutting tool having a cross-slide feed to remove excess weld material, a rotating chuck to hold the tubular material and driving means to rotate it and a movable head to properly locate the flame torches and cutting tool at the weld joint.

In the accompanying drawings, illustrating certain modifications of the invention Figure 1 is a side elevation of the apparatus;

Figure 4 is a side view taken along the line 4—4 of Figure 1 showing the flame head assembly and support;

Figure 5 is similar to Figure 4, taken along line 4—4 of Figure 1;

Figure 6 is a cross-section along line 6—6 of Figure 4 showing the flame support panel and flame heads; and Figure 7 is a flow diagram of the oxy-acetylene supply system.

Figure 1:
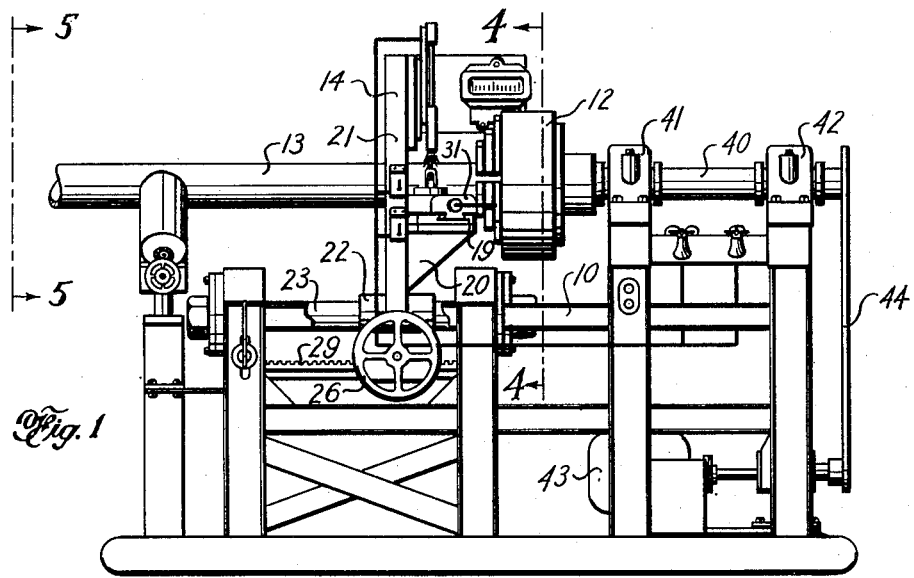
Figure 2:
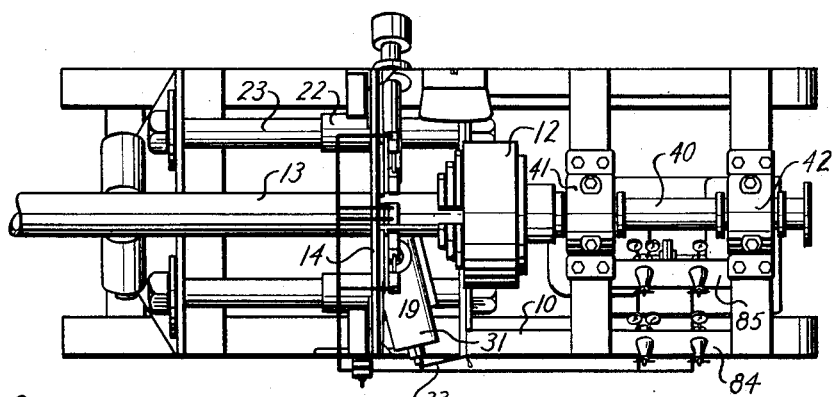
Figure 2 is a plan view of the apparatus.
Figure 3:
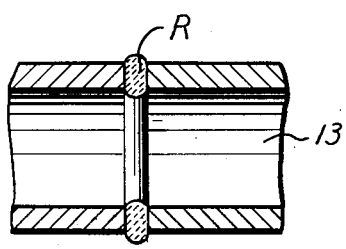
Figure 3 is a cross-sectional view of a welded section of pipe showing the ridge or upset portion about the weld.

Referring to the drawings the normalizing lathe consists of a frame or lathe bed generally indicated as 10, which is suitably braced as shown, and has mounted thereon a set of rollers 11 and a spindle or chuck 12 which rotatably secures pipe 13 in desired position. The spindle or chuck 12 is of conventional design and it is obvious that means may be provided to operatively grip different sizes of pipe and to accommodate different sizes of pipe rollers 11 may be adjusted vertically and transversely as later described.

In order to properly position the flame torches and cutting tool a movable carriage 14 is provided having upper 15 and lower 16 transverse panels. Outside and inside flame heads or torches 17 and 18, respectively, are slidably and radially carried by upper panel 15, as hereinafter described, and cutting tool assembly 19 is carried by lower panel 16 by means of supports 20.

Upper and lower panels 15 and 16 respectively are secured to standards 21, the lower ends of which form bushings 22 slidable on guideways 23. Such guideways and bushings may be of any desired cooperating configuration, such as square, oval, hexagonal, etc. Member 24 extends downwardly from bushings 22 and shaft 25, manipulated by hand wheel 26, is rotatably journaled through member 27 and carries pinion 28 meshing with rack 29. Thus manipulation of hand wheel 26 causes carriage 14 to move longitudinally of pipe 13 to be treated.

Cutting tool assembly 19 consists of a conventional lathe compound with a flat face tool set at the desired bevel or any desired type of trimmer. As shown a carballoy-tipped cutting tool 30 is secured to cross-slide feed 31 which may be moved along guideway 32 by manipulation of crank 33. Any conventional lathe compound may be employed and inasmuch as manipulation of hand wheel 26 properly positions torches 17 and 18 and cutting tool assembly 19 longitudinally of the pipe, manipulation of crank 33 brings cutting tool 30 into engagement with the weld section to trim or cut off the ridge R formed of extruded or excess weld material.

The pipe 13 is evenly heated by rotating chuck 12 which is secured to axially aligned shaft 40 with respect to pipe 13 and is carried by bearings 41 and 42, the open end of said shaft being operatively connected to driving means 43 by suitable linkage here shown as a driving belt 44. Thus although only a portion of pipe 13 is subjected to the heating medium, by rotating chuck 12, even peripheral heating of pipe 13 is secured and by subjecting pipe 13 to said heating medium for a predetermined time interval the region of said pipe so subjected will be heated to the desired temperature from outside to inside.

Referring to Figures 4, 5 and 6 of the drawings, upper panel 15 of carriage 14 has slots 45 cut on radial lines centering on the pipe to be normalized, the latter's position being determined by the position of chuck 12 and rollers 11. Adjustment panels 46 are slidably secured to panel 15 by bolts 47 and 48 fitted in slots 45. Bolts 47 and 48 may be so secured by nuts 49 and washers 50. As shown such bolts or pins are round but may be of any desired shape adapted to slide longitudinally in slots 45 with a minimum of transverse movement.

A horizontally extending adjusting bar 51, one end of which is provided with a handle, is slidably secured to panel 15 by pins 52 extending through upwardly extending slots 53 and secured by nuts 54. Adjusting bar 51 is provided with a longitudinally extending slot 55 in which pins 48 are slidably secured. As adjusting bar 51 is manipulated it will move in the direction of slots 53 thereby raising or lowering panels 46 in the direction of radial slots 45. A counterbalance (not shown) may be attached to adjusting bar 51, to offset the weight of the bar and flame heads and to provide easy adjustment.

Flame heads 17 and 18 are connected to oxygen-acetylene mixing chambers 56 by connecting pipes 57 and are assembled as a unit and rigidly connected to adjusting panels 58 by bolts 59. Panels 58 are slidably connected to panels 46 through longitudinal slots 60 in the latter by bolts 61. Thus, when bolts 61 are loosened the flame heads may be adjusted to any predetermined distance from the pipe to be normalized. Ordinarily such adjustments are made when adjusting bar 51 is in its lowermost position as indicated in Figure 4.

It has been found that a suitable adjustment for the flame heads is from approximately $\frac{1}{8}''$ to $\frac{3}{16}''$ from the pipe to be normalized, although varying distances may be used.

Thus, by manipulation of adjusting bar 51 the flame torches may be moved in the direction of radial slots 45 to the desired position from the pipe, but the heat supplied by the flame torches will be directed at all times toward the pipe thus providing efficient heating.

A combustible gas is supplied to the flame heads, and, as shown in Figure 7, an oxygen and acetylene control system is utilized to eliminate hand adjustment of the combustion mixture each time the flame heads are ignited thereby accelerating operation. The two outside flame heads 17 are cojointly supplied with oxygen and acetylene, through flexible lines 72 and 73 and 78 and 79 respectively, and inside flame head 18 is supplied with oxygen and acetylene through flexible lines 70 and 71 and 76 and 77. A valve 74 is provided in lines 72 and 73 to control the flow of combustible gases through conduits 78 and 79 to outside flame heads 17, and the flow of combustible gases in lines 76 and 77 to inside flame head 18 is independently controlled by valve 75 so that outside flame heads 17 may be shut off during the cutting operation, and if desired may be reignited to perform final heating by opening valve 74. If desired independent control of combustible gases to outside flame torches 17 may be provided by providing separate supply lines and valve to each of such torches.

Oxygen and acetylene supplied to lines 70 and 71, and 72 and 73 pass through pressure reducing valves 80 and 81 and 82 and 83 respectively which are mounted on valve mounting plates 84 and 85 respectively. One set of oxygen and acetylene pressure reducing valves 80 and 81 supplies inside flame head 18 through shut-off valve 75, and a second set of acetylene and oxygen pressure reducing valves 82 and 83 supply outside flame heads 17 through shut-off valve 75. Conduits 70, 71, 72 and 73 are flexible and have sufficient slack to allow carriage 14 to move to its farthest position from chuck 12 and connecting conduits 76, 77, 78 and 79 have sufficient slack to allow flame heads 17 and 18 to travel through their radial strokes. Flame heads 17 and 18 are cooled by indirect heat transfer by circulating a cooling medium such as water through such flame heads by means of lines 90 and 91.

A radiant pyrometer 92 having a tube 93 extending therefrom so as to indicate only the heated portion of the pipe indicates temperature on temperature scale 94 connected thereto by electrical connections 96. The pyrometer may be connected to standard 21 by bracket 95. The pyrometer and indicating means function in a well known manner and are not a part of this invention so no further description thereof will be given.

In operation flame heads 17 and 18 are raised to an uppermost position by urging adjusting bar 51 inwardly and a length of tubular material that has been butt-welded is inserted over rollers 11 and one end is gripped in chuck 12. By adjusting hand wheel 26 carriage 14 is moved into position so that flame heads 17 and 18 are directly over the weld section and carballoy cutting knife 30 is aligned with respect to the upset portion or ridge R of the weld joint.

Valves 74 and 75 are opened and flame heads 17 and 18 are ignited and lowered to a predetermined distance from the pipe by urging adjusting bar 51 outwardly.

In order to provide even heating around the periphery of the weld joint the pipe 13 is rotated by rotating chuck 12 which is operatively engaged with motor 43 as described. It has been found that even heating of the pipe may be obtained by rotating the pipe at approximately 75 R. P. M.

When the pipe has reached a normalizing temperature as indicated by pyrometer indicating means 94, the torches 17 and 18 are withdrawn by urging adjusting bar 51 inwardly. A desirable normalizing temperature range for certain types of pipe may be approximately 1600° F. to 1800° F., and it has been found in practice that a desirable radial distance from the pipe is approximately 3 inches to maintain the pipe at normalization temperature. Normally it takes approximately one minute to heat the pipe to normalizing temperature, and not over two or three minutes.

Normally only a single torch is necessary to maintain the heat of normalization in order to insure that the pipe is evenly heated from the outside to the inside and the two outside torches 17 may be shut off by closing valve 74. During this interval of maintaining the normalization heat to insure proper heating of the pipe from outside to inside the carballoy tipped knife 30 is urged toward the upset portion or ridge R of the weld joint by manipulation of crank 33 thereby cutting off the upset portion R when such portion is in a plastic or semi-plastic condition.

After the trimming operation inside torch 18 is shut off by closing valve 75, the pipe is removed from the machine and a ring of asbestos is slipped over the heated portion to insure even and slow cooling of the normalized and trimmed portion of the joint thereby producing the desired grain structure. If desired the pipe may be reheated after the cutting operation by opening valve 74 and reigniting outside torches 17. Upon removal of the pipe another pipe may be inserted and the process repeated.

It seems obvious that by manipulating hand wheel 100 and by the linkage diagrammatically shown in Figure 5, that rollers 11 may be adjusted for proper axial adjustment of pipe 13.

While the invention has been described in connection with normalizing and trimming continuous lengths of pipe it is apparent that the invention is capable of numerous modifications and variations to fit specific circumstances. For instance the invention may be applied to a wide variety of objects of noncircular cross section, such as providing heating means to various types of lathe beds where irregularly shaped objects may be normalized and trimmed. If desired the weld section may be reduced below the surface of adjacent regions, and, in some instances, electrical induction heating may be substituted for heating flames.

I claim:

1. A process of normalizing weld sections comprising heating said weld sections to normalizing temperature, maintaining said weld sections at normalizing temperature for a predetermined time interval and removing excess material from said weld sections while maintaining the latter at normalizing temperature.

2. A process of normalizing weld sections of tubular material comprising, rotating such weld sections while directing a heating medium against a portion of the exterior thereof thereby heating said sections to normalizing temperature and removing ridges on such sections formed during a welding operation by bringing a cutting tool into engagement with such ridges while so rotating and heating said sections.

3. The process of claim 2, wherein the heating medium comprises a plurality of high temperature flames.

4. A process of normalizing weld sections of pipe comprising rotating said pipe, applying high temperature heating flames to a portion of said pipe while rotating the same thereby heating said portion to normalizing temperature, directing a lesser number of high temperature flames to maintain said pipe at a normalizing temperature while rotating the same and during such last named step removing the ridges formed in the welding operation by bringing a cutting tool into engagement with such ridges while rotating said pipe.

5. A process of normalizing welded sections of pipe and removing the excess portion formed at the welded joint during the welding operation comprising rotating said pipe while directing high temperature heating flames to a portion of the welded section proximate to the joint thereof thereby heating said joint to normalizing temperature, and bringing a cutting tool into engagement with and thereby trimming said excess portion while said section is being maintained at said normalizing temperature.

6. In a process for normalizing and trimming ridges formed in butt-welding pipe, the steps of (1) heating said pipe to normalizing temperature by rotating such pipe and directing high temperature heating flames to a portion thereof longitudinally of the welded joint, (2) maintaining said welded joint at normalizing temperature for a predetermined time interval by directing a lesser number of high temperature heating flames against said portion than are directed in step (1), (3) trimming said ridges during said predetermined time interval by bringing into engagement therewith a cutting knife while rotating said pipe, (4) reheating said portion by directing a greater number of heating flames against said portion than in step (3), and (5) cooling said heated portion evenly and slowly.

ALBERT L. BURNS, Jr.

REFERENCES CITED

The following references are of record in the file of this patent:

UNITED STATES PATENTS

| Number | Name | Date |
|---|---|---|
| Re. 20,439 | Rippel | July 6, 1937 |
| 1,018,001 | Potter | Feb. 20, 1912 |
| 2,231,014 | Lytle et al. | Feb. 11, 1941 |
| 2,363,089 | Scherl | Nov. 21, 1944 |
| 2,403,229 | Murray et al. | July 2, 1946 |
| 2,412,797 | Berliner | Dec. 17, 1946 |